April 19, 1966 E. L. KOSSOY ETAL 3,247,424

PRINTED CIRCUIT CARD HOLDER

Filed Aug. 14, 1963 2 Sheets-Sheet 1

INVENTORS
Edwin L. Kossoy &
Mayer Faynberg

BY Mawhinney & Mawhinney
ATTORNEYS

PRINTED CIRCUIT CARD HOLDER

Filed Aug. 14, 1963 2 Sheets-Sheet 2

INVENTORS
Edwin L. Kossoy &
Mayer Faynberg

BY Mawhinney & Mawhinney
ATTORNEYS 3,247,424
Patented Apr. 19, 1966

3,247,424

PRINTED CIRCUIT CARD HOLDER

Edwin L. Kossoy, Scarsdale, and Mayer Faynberg, Bronx, N.Y., assignors to Premier Metal Products Co., Inc., New York, N.Y., a corporation of New York Filed Aug. 14, 1963, Ser. No. 302,049
9 Claims. (Cl. 317—101)

The present invention relates to printed circuit card holder, and has for an object to provide a holder or rack for containing a plurality of cards bearing various printed circuits thereon.

The invention relates to the type of rack or support disclosed in United States Patent 3,026,453, granted March 20, 1962, for Adjustable Three Dimensional Circuit System and has the general objects and purposes as described therein.

The invention has for a further object a simplified construction of great capacity and economical manufacture in which the pairs of guide members for slidably receiving the cards are more easily installed and held to a more perfect alignment to avoid binding upon the card or interposing difficulty to the sliding of the card into place and into electrical connection with its respective connector bar.

The invention has for its further purpose certain improvements in the rail structure which functions to interlockingly receive the guide members and to cooperate therewith in maintaining alignment thereof.

With the foregoing and other objects in view, the invention will be more fully described hereinafter, and will be more particularly pointed out in the claims appended hereto.

In the drawings, wherein like symbols refer to like or corresponding parts throughout the several views.

Referring more particularly to the drawings, 15 and 16 designate spaced end walls having front outturned slotted flanges 17 and 18 for the attachment of the holder to a suitable support in which holes 19 and 20 are for use with detent locking solid bearing slide.

Figure 2:
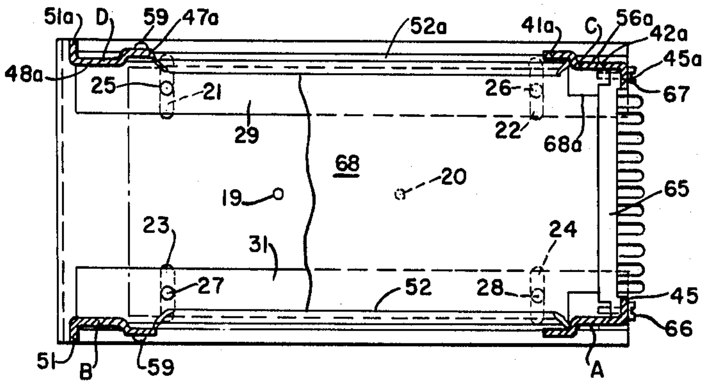
FIGURE 2 is a vertical sectional view taken on an enlarged scale on the line 2—2 in FIGURE 1 and illustrating a card, partly broken away, in place.
Figures 4, 5, 6, 7:
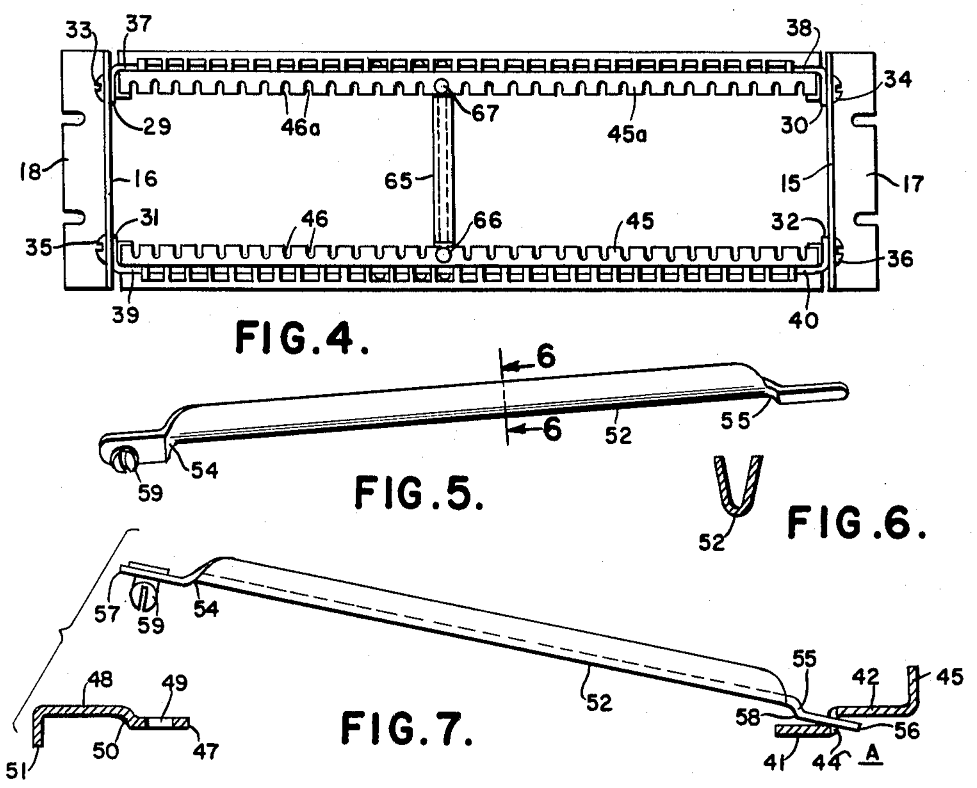
FIGURE 4 is a rear elevational view of the holder showing a connector bar in place.
FIGURE 5 is a perspective view of a form of guide member employed.
FIGURE 6 is a cross-sectional view taken on a magnified scale on the line 6—6 in FIGURE 5.
FIGURE 7 is a fragmentary cross-sectional view taken through the two rails of the lower frame and illustrating in side elevation a guide member in an initial position.

As shown more particularly in FIGURE 2 the end walls are also provided with upper vertically elongated slots 21 and 22 and lower vertically elongated slots 23 and 24 for adjustably receiving upper screws 25 and 26 and lower screws 27, 28 or other appropriate fastenings. These screws are adjustable up and down in the vertical slots and they are threaded into upper attaching plates 29 and 30 which are abutted against upper portions of the end walls 15 and 16, as indicated in FIGURES 2 and 4. The lower screws 27 and 28 are similarly threaded into lower attaching plates 31 and 32 abutted against lower portions of the end walls 15 and 16. The upper screw heads are shown at 33 and 34 and the lower screw heads at 35 and 36 in FIGURE 4, which may be tightened against the external surfaces of the end walls 15 and 16 to bind the attaching plates in place after adjustment.

The upper attaching plates 29 and 30 are provided with upper inturned flanges 37 and 38 and the lower attaching plates 31 and 32 are provided with lower flanges 39 and 40. These flanges serve as supports for upper and lower rectangular open frames which comprise in part said attaching plates and the two lower rails A and B and the two upper rails C and D, so lettered in FIGURE 2.

Figure 8:
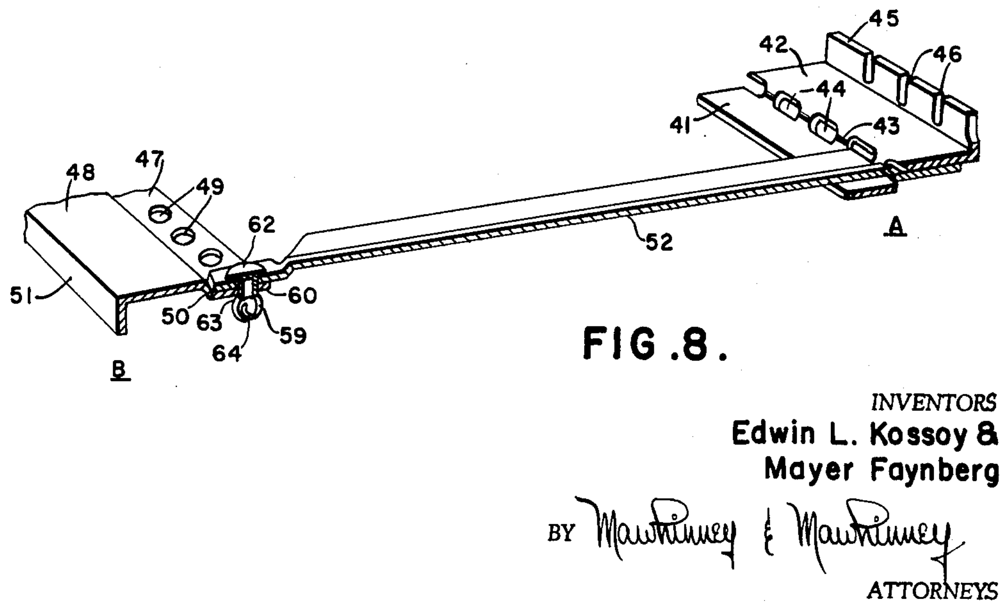
FIGURE 8 is a fragmentary perspective view with parts broken away and parts shown in section of the same two rails illustrating the guide member in final position.

As shown more particularly in FIGURES 7 and 8, the lower frame rear rail A comprises generally an inner flat horizontal bar 41 and an outer flat horizontal bar 42 with the inner bar 41 disposed at a lower elevation, said bars 41 and 42 being joined at their adjacent longitudinal edges by a web 43 having longitudinally spaced slots 44 therethrough. The outer bar 42 has an upstanding flange 45 along its outer longitudinal or rear edge. In the flange 45 are slots 46 open at their upper ends. In number these slots 46 correspond to the slots 44 and are disposed in alignment therewith.

The lower frame front rail B which parallels the rear rail A is comprised generally of an inner flat horizontal bar 47 and an outer flat horizontal bar 48 stepped upwardly in an elevated plane above the bar 47. The bar 47 is provided with spaced vertical openings 49 corresponding in position and number with the slots 44 and 46 of the rear lower rail A.

The bars 47 and 48 of the front lower rail B are connected together by a web 50 which may be solid or imperforate. At the front edge of the bar 48 is a downturned flange 51 more particularly for rigidifying purposes.

The inner bars 41 and 47 of the two lower rails A and B are preferably in the same horizontal plane stepped down from the upper plane in which the outer bars 42 and 48 are located.

Figure 3:
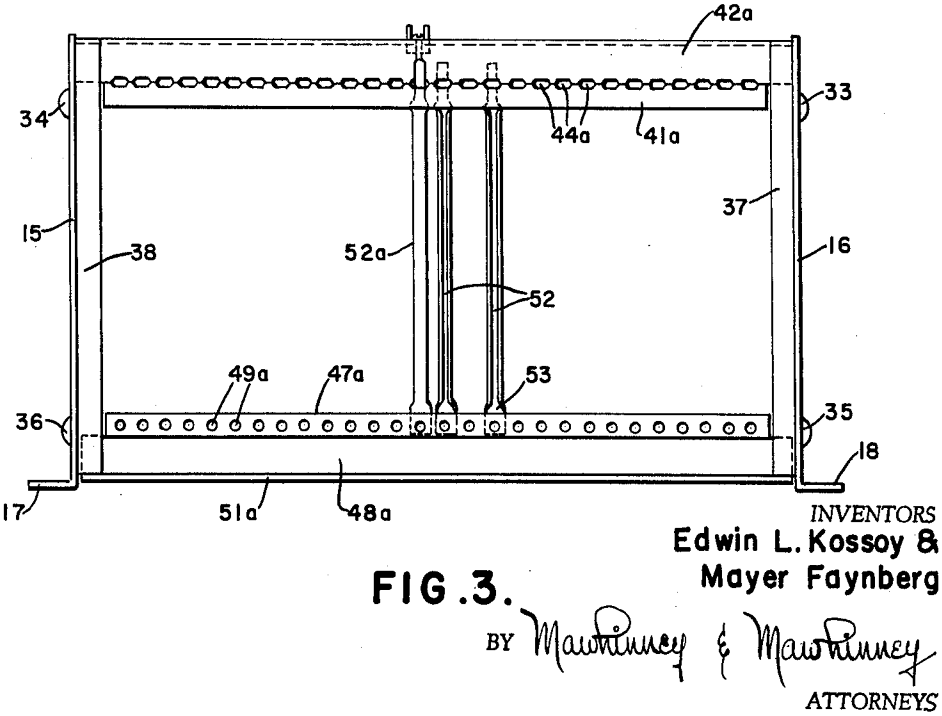
FIGURE 3 is a top plan view of the holder showing by way fo example two of the lower and one upper guide members.

Lower channel guide members 52 in any suitable number up to the capacity of the whole are detachably mounted across the rails A and B. One such lower guide member 52 is shown more particularly in FIGURES 5 and 6 in which a length of sheet metal is bent up at opposite sides into a channel formation, as shown in FIGURE 6, in which the side walls may diverge upwardly, the guide members 52 being open at their upper ends. In FIGURE 3 the front ends of the guide members are preferably flaring as indicated at 53 in FIGURE 3 to guide the lower edge of the card into the channel.

The guide members at ends thereof beyond the channels are offset downwardly as indicated at 54 and 55 and terminate in flat rear and front tongues 56 and 57. The formation of the offset 55 and the rear tongue 56 produces a heel 58 slidable on the upper surface of the bar 41 of the lower rear rail A. The front tongue 57 of each guide member carries a resilient ball fastener 59 oriented to the vertical openings 49 in the inner bar 47 of the lower front rail B. These ball fasteners depend from shanks 60 slidably mounted through perforations 61 made in the flat front tongues 57 of the guide members, being held from dropping through the perforations by base discs 62.

However, the shanks 60 are longer than the thickness of the tongues 57 so that in the normal vertical position, as shown in FIGURES 7 and 8, the fasteners will gravitate to a lowermost position until arrested by the base discs 62 encountering the upper surface portions of the tongues 57, it being understood that the base discs 62 are of greater diameter than the perforations 49. At the juncture of the shanks 60 and resilient ball fasteners 59 are outstanding ridges 63 which are adapted to catch beneath the bar 47 when the fasteners are pressed downwardly through the perforations 49, it being understood that due to the slots 64 in the ball fasteners such fasteners may contract during passage of the ball heads through the perforations 49 but are free to expand when passing below the tongues 57. This action which may be promoted by the thumb of the operator pressing down upon the base discs 62 will insure a tight interlocking engagement of the fasteners and guide members with the bar 47 and will cause the forward ends of the tongues 57 to slide down the webs 50, the webs thereupon forming an abutment for preventing any casual or accidental movement of the guide members toward or from the rails A and B.

FIGURE 7 shows a preferred method of assembly wherein initially the rear tongue 56 of a guide member will be entered through a slot 44 of the lower rear rail A, the engagement of the tongue 56 with the web 43 thus forming a fulcrum about which the guide member 52 may then be rotated from the position of FIGURE 7 down to the final position of FIGURE 8. It will be noted that in this final position the heel 58 has not moved off the inner bar 41 of the rear rail A but has acted to force the upper surface of the tongue 56 into contact throughout with the lower surface of the outer bar 42 of the lower rear rail A, thus forming a tight engagement which resists any longitudinal play of the rear ends of the guide members in the slots 44, it being understood that some tolerance is necessary to facilitate the manual application of these rear tongues 56 through the slots 44.

It will also be understood that the fasteners 59 are perpendicular to the plane of the tongues 57 and, therefore, they react with the walls of the openings 49 to resist any play of the guide members in a fore and aft direction from or between the rails A and B. Thus while the guide members may be readily removed by pulling up on the forward ends of the guide members to dislodge the fasteners 59 from the perforations 49, when in place, as shown in FIGURE 8, the alignment of the channels of the guide members 52 is accurately preserved whereby sliding of the circuit cards therein may be accomplished without binding.

It will thus be understood that the diameter of the resilient fasteners 59 is greater than that of the perforations 49 requiring downward pressure to cause compression of the ball fasteners until such ball fasteners 59 clear the lower portions of the tongues 57. Due to the part at least spherical shape of the fasteners 59, the upper curvilinear contour will have a camming effect reacting on the lower surface of the bar 47 to hold the fastener in place and the guide member from any movement.

From FIGURE 2 it will be apparent that the rear rail C of the upper frame is constructed precisely as the lower rear rail A. However, the upper rear rail C is inverted relatively to the lower rail so that the flange 45ᵃ extends downwardly and the inner bar 41ᵃ is disposed in a plane lying above the horizontal plane of the outer bar 42ᵃ. This construction is also illustrated in FIGURE 3 where the slots in the web are indicated at 44ᵃ.

In like manner the front rail D of the upper frame is constructionally like the lower front rail B but is inverted so that the flange 51ᵃ of the bar 48ᵃ extends upwardly and the inner bar 47ᵃ is disposed in a horizontal plane above that of the outer bar 48ᵃ. This construction is shown in both FIGURES 2 and 3. In the latter figure the perforations 49ᵃ are shown and one of the upper guide members 52ᵃ is shown as reversed in position so that its channel is disposed downwardly in the same vertical plane as the channel of its companion lower guide member 52. That the upper and lower guide members 52ᵃ and 52 are mounted in pairs is shown in FIGURE 2.

As shown in FIGURES 2 and 3 the tongues 56ᵃ of the upper guide members 52ᵃ rest upon the upper surface of the outer bar 42ᵃ while at the forward ends of the upper guide members 52ᵃ the resilient ball fasteners are thrust upwardly through the perforations 49ᵃ of the bar 47ᵃ.

Referring more particularly to FIGURES 2 and 4, 65 designates a connector bar of conventional form having upper and lower ends fitted forwardly of the flanges 45 and 45ᵃ to which the connector bar is held by screws or other fasteners 66 and 67, the screws engaging in the slots 46 of the lower upstanding flange 45 and similar slots 46ᵃ in the upper down-turned flange 45ᵃ.

Figure 1:
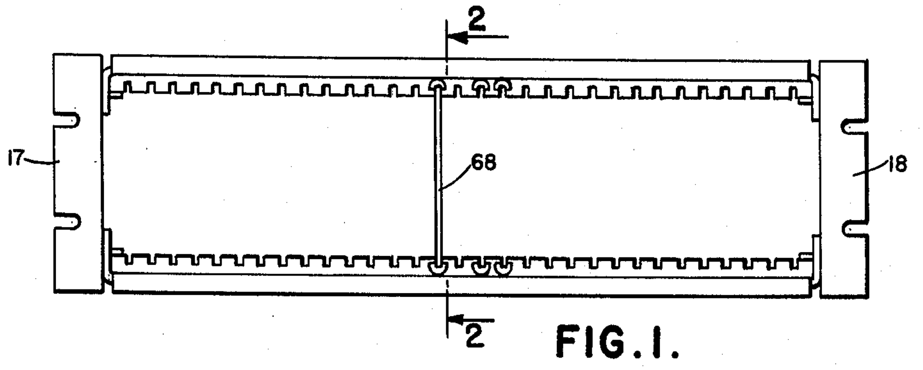
FIGURE 1 is a front elevational view of a form of printed circuit card holder constructed in accordance with the invention showing by way of example a single card in place therein.

A card 68 is indicated in FIGURES 1 and 2 as being representative of any number of cards that may be slid through the front end of the holder with its lower and upper edges engaging in the channels of the pair of vertically aligned guide members 52ᵃ and 52. As these cards are slid into place reduced end portions 68ᵃ thereof will slide into the conventional groove of the connector bar 65.

Due to the accurate alignment of such pairs of guide members the introduction and removal of the circuit cards may be accomplished easily and they will accurately register with the connector bars at the rear of the frame.

Due to its construction the holder lends itself to embodiment in metal material, for instance, sixteen gauge cold rolled steel with the guide members preferably made of cadmium plated and colored iridite. The frame is attractively finished in gray hammertone.

It will be understood of course that the invention is not restricted to any particular material of which the frame or other parts may be made.

The terms front and rear, upper and lower are relative terms used conveniently for descriptive purposes. Where the frame is turned so that it rests on the rear portion, the front would become the top and the plates would be slid vertically downward into the pairs of guide members. It will be understood that the holder is simply constructed of solid end walls, free openings at front and rear and free openings vertically through the rectangular upper and lower frames.

The adjustment of the upper and lower frames vertically through slots in the end walls permits of a closer approach of the pairs of guide members or their further separation pursuant to the size of card to be stored.

Although we have disclosed herein the best form of the invention known to us at this time, we reserve the right to all such modifications and changes as may come within the scope of the following claims.

What is claimed is:

1. A printed circuit card holder comprising
(a) end walls,
(b) front and rear upper and lower pairs of rails attached at their end portions to the end walls, the lower rear rail comprising
(c) inner and outer substantially flat horizontal bars in which the inner bar is at a lower level than the outer bar,
(d) slotted webs connecting the adjacent edges of the bars, the lower front rail comprising
(e) inner and outer substantially flat horizontal bars in which the inner bar is also at a lower level than the outer bar, said inner bar having
(f) substantially upright perforations therethrough,
(g) a guide member for slidably receiving the lower edge of a printed circuit card having
(h) downwardly offset end portions resting on the inner bars,
(i) tongues extending from the offset end portions, one such tongue being a pilot tongue disposed in a selected slot of the web,
(j) a resilient fastener projecting angularly down from the other tongue detachably disposed in a selected perforation of the inner bar of the lower front rail by a downwardly levering action of the guide member about the lower rear rail, and (k) a companion guide member carried by the upper rails in substantial vertical registry with the first-named guide member.

2. A printed circuit card holder comprising
(a) end walls,
(b) front and rear upper and lower pairs of rails attached at their end portions to the end walls, the lower rear rail having
(c) inner and outer bars in stepped relation,
(d) slotted webs connecting the bars, the lower front rail having
(e) substantial vertical perforations therethrough,
(f) lower guide members spanning the distance between the lower front and rear rails and having downwardly offset end portions resting on the lower rails and elevating the guide members for slidably receiving the lower ends of printed circuit cards, said lower guide members having
(g) pilot tongues extending from the rear ends of the members and engaging slidably and pivotally through the slots in the webs,
(h) resilient fasteners extending substantially perpendicular from the offset front ends of the members detachably disposed in selected perforations of the lower front rail, and
(i) companion guide members for slidably receiving the upper edges of the cards and detachably connected to and between the upper front and rear rails.

3. A printed circuit card holder comprising
(a) end walls,
(b) front and rear upper and lower pairs of rails attached to the end walls, the lower rear rail having
(c) a succession of spaced slots horizontally therealong facing forwardly, the front rail having
(d) a series of spaced perforations arranged vertically and matching in number and position the slots of the rear lower rail,
(e) lower guide members for slidably receiving lower edges of the printed circuit cards having
(f) front and rear downwardly offset portions resting upon the lower rails,
(g) pilot tongues extending from the offsets at the rear end portions of the guide members disposed in said slots and articulating with the walls thereof in a substantially vertical arcuate movement of the guide members about the rear lower rail,
(h) front projecting tongues at the offset level of the front portion of the guide members resting upon the front lower rail,
(i) resilient projections on the front projecting tongues positioned to engage in selected perforations incident to the downward swinging movement of the lower guide members,
(j) upper guide members complemental to the lower guide members for slidably receiving the upper edge of the cards, and
(k) means for detachably receiving and supporting the end portions of the upper guide members from the front and rear upper rails.

4. A printed circuit card holder comprising
(a) end walls,
(b) front and rear upper and lower pairs of rails attached at their end portions to the end walls, the upper rear rail comprising
(c) inner and outer substantially flat horizontal bars in which the inner bar is at a higher level than the outer bar,
(d) slotted webs connecting the adjacent edges of the bars with the slots facing forwardly, the upper front rail comprising
(e) inner and outer substantially flat horizontal bars in which the inner bar is also at a higher level than the outer bar and has
(f) substantially upright perforations therethrough,
(g) a guide member having a channel opening downwardly for slidably receiving the upper edge of a printed circuit card, said guide member having upwardly offset end portions engaging the lower surface of the inner bar of the rear upper rail and the lower surface of the front rail,
(h) rear tongues extending from the offset portions of the rear ends of the guide members disposed in the slots and overlying the outer bar of the rear upper rail,
(i) detachable fasteners projecting upwardly from offset front portions of the upper guide members adapted to be detachably entered upwardly through the perforations, and
(j) companion lower guide members spanning and connected to the lower front and rear rails in substantially vertical alignment with the upper guide members for slidably receiving the lower edges of the cards.

5. A printed circuit card holder comprising
(a) end walls,
(b) front and rear upper and lower pairs of rails attached at their end portions to the end walls, the front rails having
(c) substantially vertical perforations therethrough in a lengthwise sequence, said rear rails having
(d) inner and outer bars at different horizontal levels,
(e) webs connecting the adjacent longitudinal edges of the inner and outer bars and having,
(f) slots in a longitudinal sequence therein,
(g) upper and lower pairs of guide members having confronting channels for slidably receiving upper and lower edges of the cards,
(h) rear tongues on the rear end portions of the guide members disposed in the slots of the rear rails supporting the rear ends of the guide members, and
(i) resilient contractile and expansible fasteners projecting at substantially right angles from front portions of the guide members and disposed in selected perforations of the front rails.

6. A printed circuit card holder as claimed in claim 5, further comprising
(j) substantially vertical flanges at the rear portions of the rear rails, and
(k) a connector bar adjustably and removably connected to said flanges in an orientation in which the connector bar receives the inner end portion of the card as it is slid to final home position in the guide members.

7. A printed circuit card holder as claimed in claim 5, further comprising
(j) front tongues on the guide members carrying said fasteners in a substantially perpendicular relation to the planes of the front tongues, said upper and lower front rails including
(k) inclined webs against which the front tongues engage in the attached positions of the guide members.

8. A printed circuit card holder as claimed in claim 5, in which said fasteners comprise
(j) shanks slidably fitted at right angles to the plane of the guide members,
(k) wide bases on upper portions of the shanks preventing the fasteners from dropping through the guide members,
(l) resilient ball heads of at least part-spherical form slotted to contract and expand and having ridged part-spherical portions adjacent the shanks engaging portions of the forward rails incident to the home positions of the fasteners.

9. A printed circuit card holder comprising
(a) end walls,
(b) front and rear upper and lower pairs of rails carried at their end portions by the end walls, the rear rails comprising (c) inner and outer flat substantially horizontal bars at displaced vertical levels, (d) webs connecting adjacent longitudinal edge portions of said bars and having (e) spaced slots therein facing forwardly, said front rails comprising (f) inner and outer flat substantially horizontal bars displaced at different horizontal levels, (g) webs connecting adjacent longitudinal edges of the last-mentioned bars, (h) pairs of upper and lower guide members having confronting open channels for the free sliding therethrough of upper and lower edges of the cards, said guide members having (i) offset end portions engaging the inner bars of the upper and lower front and rear rails, the offset portions at the rear ends of the guide members having (j) pilot tongues extending at the offset level disposed in the slots of the rear rail webs and articulating substantially vertically therewith, (k) forward tongues projecting at the offset level from the front parts of the guide members, and (l) complemental fastener means between the forward tongues and the inner bars of the front rails maintaining the guide members in place in the holder.

No references cited.

KATHLEEN H. CLAFFY, *Primary Examiner.*

JOHN F. BURNS, *Examiner.*